No. 845,789. PATENTED MAR. 5, 1907.
W. P. HUSSEY.
STEAM HEATING APPARATUS.
APPLICATION FILED JULY 5, 1906.

3 SHEETS—SHEET 1.

WITNESSES:
W. M. Gentle.
N. Allemong.

INVENTOR.
William P. Hussey
BY V. H. Lockwood
ATTORNEY.

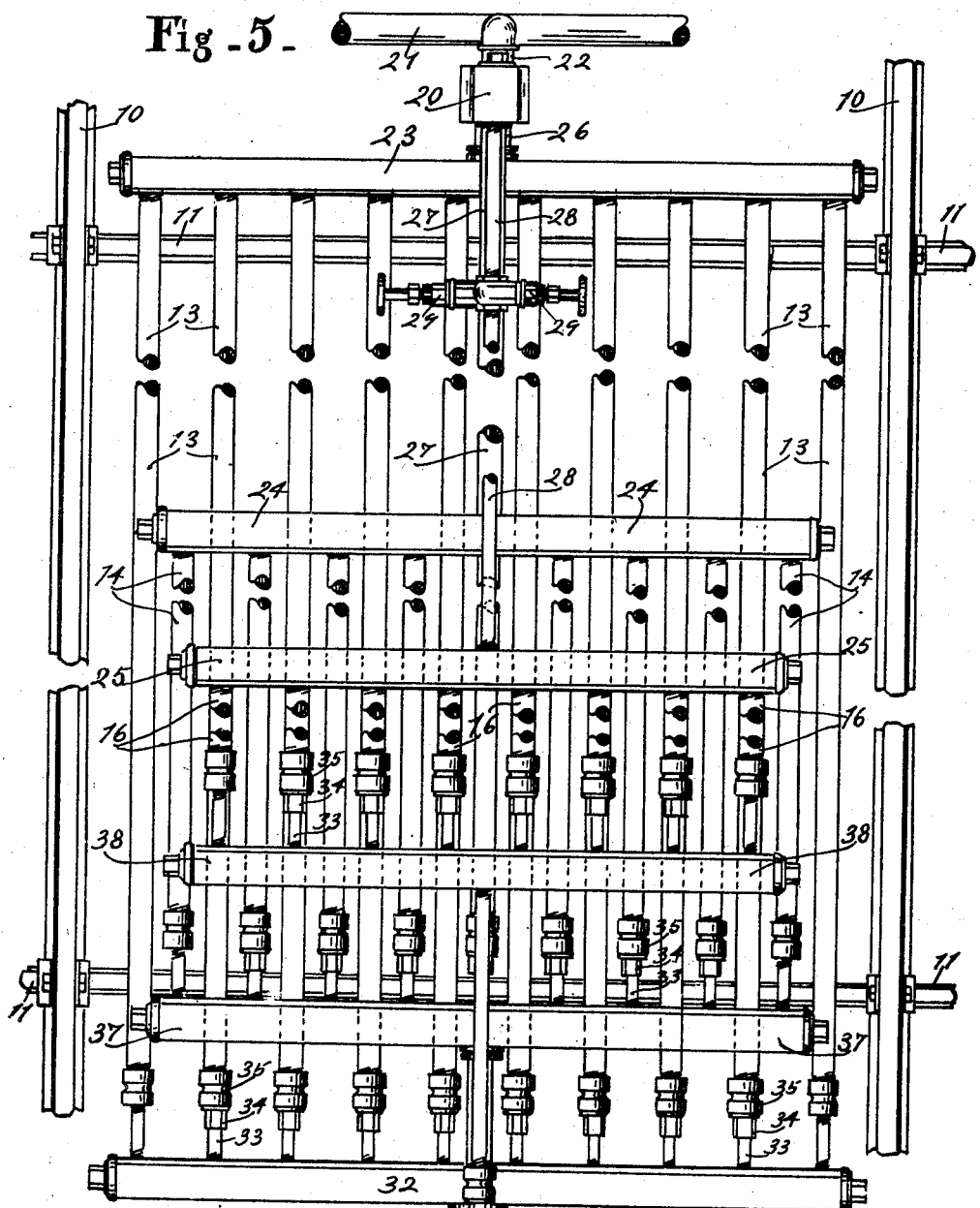

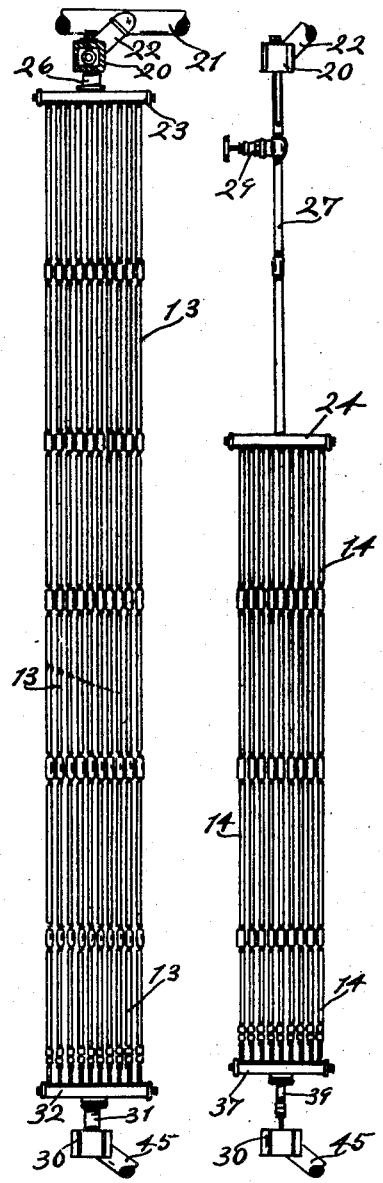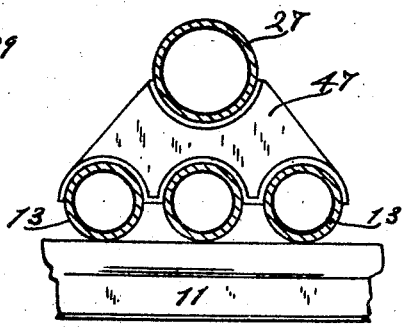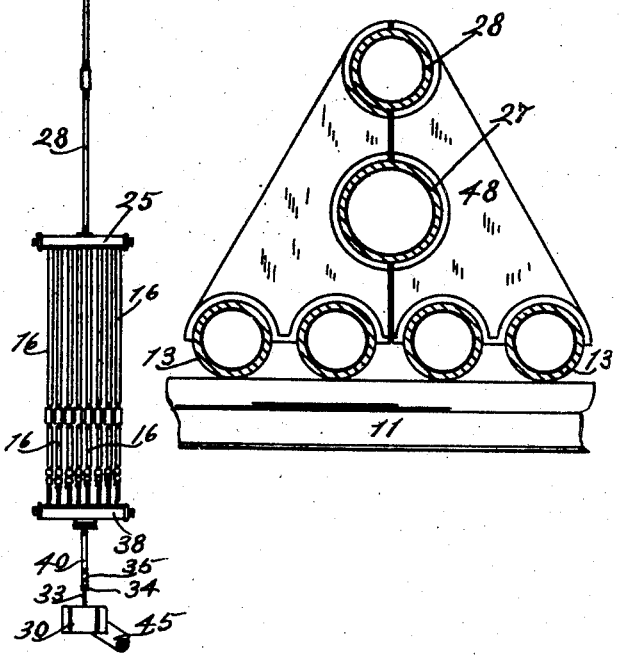

UNITED STATES PATENT OFFICE.

WILLIAM P. HUSSEY, OF INDIANAPOLIS, INDIANA, ASSIGNOR TO THE STANDARD DRY KILN COMPANY, OF INDIANAPOLIS, INDIANA, A CORPORATION OF INDIANA.

STEAM-HEATING APPARATUS.

No. 845,789.  Specification of Letters Patent.  Patented March 5, 1907.

Application filed July 5, 1906. Serial No. 324,749.

*To all whom it may concern:*

Be it known that I, WILLIAM P. HUSSEY, of Indianapolis, county of Marion, and State of Indiana, have invented a certain new and useful Steam-Heating Apparatus; and I do hereby declare that the following is a full, clear, and exact description thereof, reference being had to the accompanying drawings, in which like letters refer to like parts.

The object of this invention is to improve the heating apparatus in dry-kilns and other kinds of driers where the material is moved through the drier by way of simplifying the construction and arrangement and increasing the degree of heat as the material to be treated passes through the drier.

One feature of the invention consists in a plurality of series of parallel longitudinally-extending heating-pipes, the different series varying in length and superimposed upon each other, there being one header at each end of the entire apparatus, which has communicating connection with all series of heating-pipes.

The full nature of this invention will be more fully understood from the accompanying drawings and the following description and claims.

Figure 1:
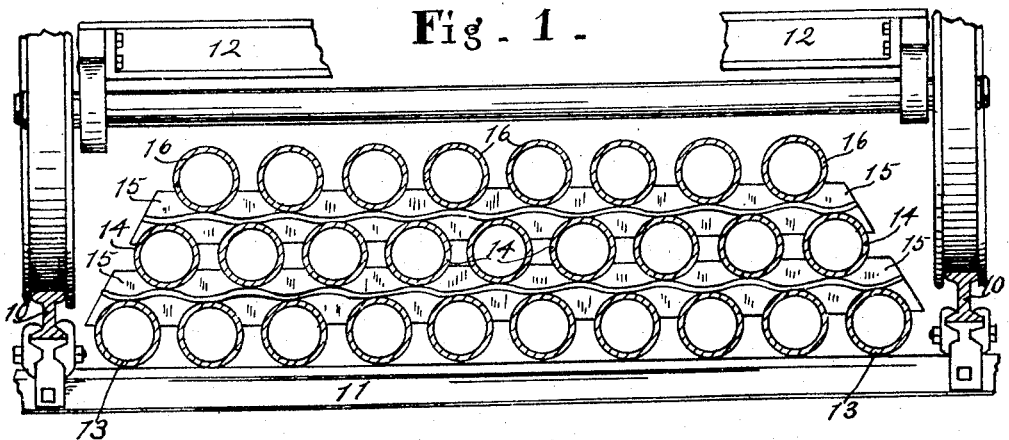
Figure 2:
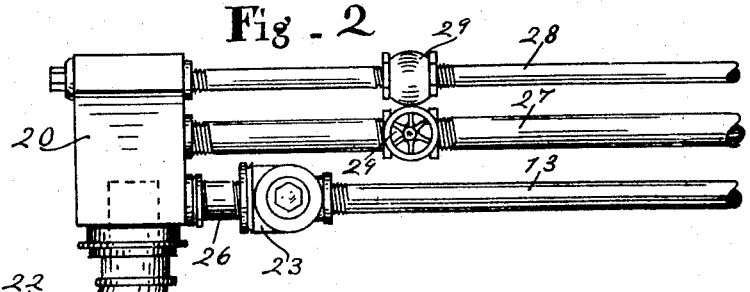
Figure 3:
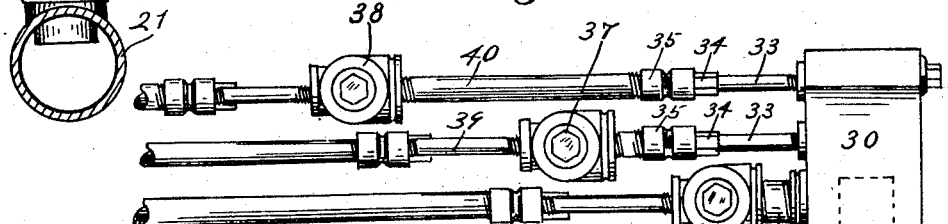
Figure 4:
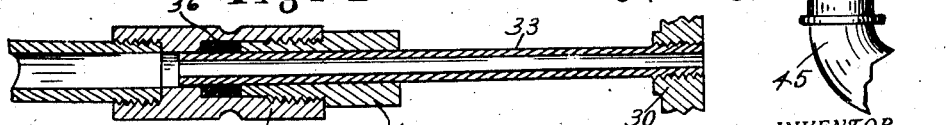

In the drawings, Figure 1 is a transverse section of the heating apparatus and the lower part of a truck. Fig. 2 is a side elevation of the inlet end of the pipes. Fig. 3 is a side elevation of the outlet end thereof. Fig. 4 is a central longitudinal section of parts, showing the expansion-joints. Fig. 5 is a plan view of the apparatus centrally broken away in places. Fig. 6 is a plan view of the lower series of pipes and end connections, the inlet-header being shown in horizontal section. Fig. 7 is a plan view of the second series of pipes and connections. Fig. 8 is a similar view of the lower series of the pipes and connections. Fig. 9 is a transverse section through the pipe leading to the second series of heating-pipes, an elevation of the spreader for supporting said pipes, a section across the three pipes in the lower series of heating-pipes on which the spreader rests, and a support for said lower pipes broken away at its lower ends. Fig. 10 is a transverse section through the pipes leading to the second and third series of heating-pipes and four pipes of the lower series of heating-pipes, showing in elevation a modified two-piece spreader and the means for supporting the lower pipes broken away at its ends.

In the drawings, there is shown a railway or truck track consisting of rails 10 and ties or supports 11. This track is adapted for a truck 12, upon which the material to be dried or treated is conveyed through the drier.

Three series of heating-pipes are shown—a lower longer series of pipes 13, a shorter series of pipes 14, carried by spreaders 15 upon the pipes 13 and staggered with relation thereto, and a still shorter series of pipes 16 on the spreaders 15, mounted on the series 14 immediately below and also staggered over the last-mentioned pipes. The lower series of pipes is mounted on the cross-ties or supports 11 and longitudinally of the track-rails, and the entire series of heating-pipes in the staggered arrangement mentioned making an assemblage of pipes that extend above the track-rails and slope or taper on each side upward and away from the track-rail, so the wheels of the truck while running on the track will not be in danger of engaging the heating-pipes and the heating-pipes will be up close to the material carried by the truck.

In operating the drying apparatus herein shown it is desirable that as the truck carrying the material to be treated moves on through the drying apparatus or structure the heat imparted by the pipes proportionally increases, so that the material on the truck receives the highest degree of heat in the latter part of the operation. Hence the lower series of pipes 12 extends for the entire length of the track, while the series of pipes 14 above extends along two-thirds of the track, and the third series of pipes 16 along one-third of the track. At the inlet end there is a main steam-header 20, supplied at its under side with steam through a pipe 21, leading from some steam-supply and provided with a loose joint 22, so the header 20 and the pipe 21 may have some independent movement relative to each other. Each series of pipes has a subordinate header 23, 24, and 25, respectively. The subordinate header 23 for the lower series of pipes 13 is centrally connected with the main header 20 by a short pipe 26, and the headers for the other series of pipes are connected with said main header 20 by pipes 27 and 28, respectively. The pipes 26, 27, and 28 are centrally located one above another and are each in a horizontal plane with the series of pipes to which they supply steam. The pipes 27 and 28 have valves 29, so that either or both may be closed.

The main outlet-header 30 is connected by a pipe 31 with a subordinate outlet-header 32, which in turn is connected with the pipes of the lower series.

The connection between the two lateral pipes of each series and the corresponding headers is a rigid one; but the connections between the intermediate pipes of each series and one of the headers is effected by expansion-joints, consisting of pipes 33 and nuts 34 and 35, which include between them compressed packing 36. The nut 34 connects both pipes 33 and 13, while the nut 35 compresses the packing around the smaller pipe or outlet-header 32. There are similar subordinate outlet-headers 37 and 38 in the other series of pipes, that are similarly connected with its respective series, and from each there is a pipe 39 and 40, respectively, that leads centrally to the main header 30, with which they are connected by expansion-joints similar to those described. All three series of heating-pipes terminate near the main outlet-header 30; but the upper series are quite distantly removed from the main inlet-header 20. The main inlet and outlet headers 20 and 30 are vertically disposed, as the three pipes connected with them are arranged over them. A pipe 45 with a loose joint leads from the outlet-header 30 to a waste-pipe 46. The pipe 27 is carried by a small spreader 47, that is triangular in general form, with a concave seat for its pipe in its apex and three concave seats in its lower part for its lower pipes, as shown in Fig. 9. The pipes 27 and 28 are carried by a two-piece spreader 48, the two pieces being triangular in general form, with coöperating concave seats in their adjacent edges for said pipes and concave seats in the lower edges for the lower pipes, as shown in Fig. 10.

With this arrangement a piping system may be made up conveniently and of sections of pipes of the same dimensions, and ample opportunity is allowed for expansion and contraction, and the pipes are closer to the material to be treated and the heat is greater as the truck proceeds.

I claim—

1. In a heating apparatus, a plurality of superimposed series of heating-pipes, each series of pipes being shorter than the next lower series of pipes, a main header at each end of the apparatus, a subordinate header at each end of each series of pipes, and a communicating connection between the main header and each subordinate header at each end of the apparatus.

2. In a heating apparatus, a plurality of superimposed series of heating-pipes, each series of pipes being shorter than the next lower series of pipes, a main header at each end of the apparatus, a subordinate header at each end of each series of pipes, a communicating connection between the main header and each subordinate header at each end of the apparatus, and independent means in each of said communicating connections for controlling the admission of steam to each series of pipes.

3. In a heating apparatus, a plurality of superimposed series of heating-pipes parallel with each other, each upper series of pipes being shorter than the next lower series of pipes, a main header at each end of the apparatus, a subordinate header at each end of each series of pipes, a centrally-located pipe leading from each subordinate header to the corresponding main header, and valves in all but one of said centrally-located pipes at the steam-inlet end of the apparatus.

4. In a heating apparatus, a plurality of superimposed series of heating-pipes parallel with each other, each upper series being shorter than the next lower series of pipes, a main header at each end of the apparatus, a subordinate header at each end of each series of pipes, a centrally-located pipe leading from each subordinate header to the corresponding main header, and expansion-joint connections between the main and the subordinate outlet-headers.

In witness whereof I have hereunto affixed my signature in the presence of the witnesses herein named.

WILLIAM P. HUSSEY.

Witnesses:
NELLIE ALLEMONG,
HELEN B. McCORD.